US007127722B2

(12) United States Patent
Cheng et al.

(10) Patent No.: US 7,127,722 B2
(45) Date of Patent: Oct. 24, 2006

(54) METHOD AND APPARATUS FOR AVOIDING MULTIPLE PROCESSING OF THE SAME IPMI SYSTEM EVENT

(75) Inventors: Heung-For Cheng, Portland, OR (US); Mahendra A. Ramachandran, Portland, OR (US); Srinivas Vuppula, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 400 days.

(21) Appl. No.: 09/884,400

(22) Filed: Jun. 18, 2001

(65) Prior Publication Data

US 2002/0194392 A1 Dec. 19, 2002

(51) Int. Cl.
*G06F 9/46* (2006.01)
*G06F 11/30* (2006.01)
(52) U.S. Cl. ..................... 719/318; 709/224
(58) Field of Classification Search ............... 709/318, 709/224; 707/8; 719/318; 702/186, 188
See application file for complete search history.

(56) References Cited

U.S. PATENT DOCUMENTS

| 5,592,664 | A | * | 1/1997 | Starkey ................ 707/1 |
| 5,764,886 | A | * | 6/1998 | Danielson et al. ......... 714/47 |
| 5,961,583 | A | * | 10/1999 | Van Fleet ................ 718/102 |
| 6,473,795 | B1 | * | 10/2002 | Danielson et al. ......... 709/224 |
| 2002/0099786 | A1 | * | 7/2002 | Chun ................... 709/215 |

OTHER PUBLICATIONS

"Intelligent Platform Management Interface Specification v1.0," Sep. 1998, p. 1-13, 23, 69 and 93-103.*

* cited by examiner

*Primary Examiner*—William Thomson
*Assistant Examiner*—Li Zhen
(74) *Attorney, Agent, or Firm*—Blakely, Sokoloff, Taylor & Zafman LLP

(57) ABSTRACT

One aspect of the invention provides a novel scheme to prevent multiple processing of the same system events of an Intelligent Platform Management Interface by providing a mechanism to determine the last processed event ID. Another aspect of the invention provides a mechanism to synchronize access to the system event log by granting one of one or more system management applications exclusive access to the system event log thereby preventing other system management applications from processing the same event more than once.

18 Claims, 6 Drawing Sheets

| Record ID | Event |
|---|---|
| 013 | Chassis Intrusion |
| 014 | Temperature Out-of-Range |
| 015 | Voltage Out-of-Range |
| 016 | Fan Speed Below Threshold |
| 017 | Power Supply Failure |
| ⋮ | ⋮ |
| 039 | Hot Plug Slot Power Off |
| 040 | Processor Error |
| 041 | Memory Error |

METHOD AND APPARATUS FOR AVOIDING MULTIPLE PROCESSING OF THE SAME IPMI SYSTEM EVENT

FIELD

The invention pertains generally to system management software to manage system components. More particularly, the invention relates to a scheme to improve the operation of the Intelligent Platform Management Interface (IPMI) event mechanism so that each event is processed only once.

BACKGROUND

The Intelligent Platform Management Interface (IPMI), version 1.5, revision 1.0, is an industry initiative for system management software that manages system components such as temperature sensors, voltage sensors, fan sensors, power controls, and other system components and devices. IPMI running on a system, such as a server, may be implemented as a distributed management platform where remote systems may access and manage the IPMI enabled system.

The event mechanism is a major feature in IPMI to indicate the occurrence of a system event to the system management software. The occurrence of an event is recorded in the IPMI System Event Log (SEL) as a SEL record. The management software periodically polls the IPMI SEL records to determine if a new event has been registered. The software may take appropriate actions based on the type of event. For example, if the event is Chassis Intrusion, the software may shutdown the system, and may send a corresponding page or message to the system administrator. In some implementations, it may be necessary for each SEL event to be processed one time only.

Under certain conditions, SEL events may be unnecessarily processed more than once. This is because when the system management software reads a SEL record, the IPMI does not indicate that the record has been read. This may cause the SEL record to be processed multiple times in some situations.

A few cases in which a SEL record may be unintentionally processed more than once include where 1) a system reboot has occurred, 2) a new operating system is installed in a host system running the system management software, and 3) multiple system management software processes access the SEL to manage the IPMI.

DETAILED DESCRIPTION

In the following description numerous specific details are set forth in order to provide a thorough understanding of the invention. However, one skilled in the art would recognize that the invention may be practiced without these specific details. In other instances, well known methods, procedures, and/or components have not been described in detail so as not to unnecessarily obscure aspects of the invention.

Various aspects of the invention provide novel schemes to avoid multiple processing of the same SEL record by system management software. As used herein, system management software refers to software applications which may process system events. System management applications may refer to one or more instances of the same or to different system management software. A host system may refer to a server, processing unit, and/or computer unit implementing and running the IPMI. System management applications can run locally on the host system to control, access, and/or communicate with the host system through the IPMI. A remote system refers to any processing unit or computer unit capable of running a system management application to control, access, and/or communicate with the host system through the IPMI. References to the Intelligent Platform Management Interface (IPMI) herein refer to all versions of the IPMI specification and standard including version 1.5, revision 1.0.

Some cases where a SEL record may be unintentionally processed more than once include where 1) the IPMI host system is rebooted, 2) a new operating system is installed in a host system running the system management software, and 3) where multiple system management software operate on the same IPMI-enabled host system.

Figures 1, 2:
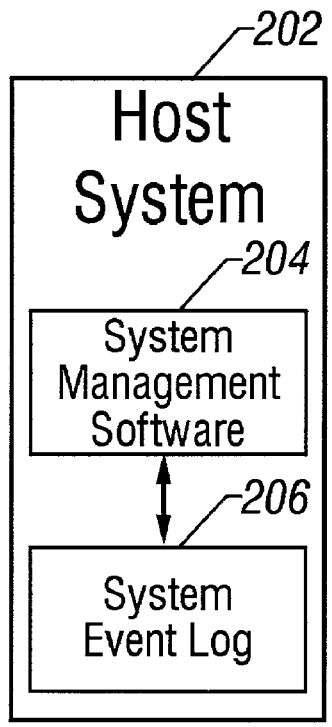
FIG. 1 is an illustration showing an exemplary embodiment of a System Event Log including various exemplary record IDs and events.
FIG. 2 is a block diagram illustrating a host system running system management software to access the SEL records locally on the IPMI host system.

FIG. 1 illustrates an exemplary embodiment of a SEL 102 including various exemplary record IDs and events. This may represent a list of SEL records/events as stored by the IPMI of a host system. Note that the events and record IDs shown are for purposes of illustration and a person of ordinary skill in the art would recognize that may other events and record ID schemes may be employed without deviating from the invention.

FIG. 2 illustrates an IPMI-enabled host system 202 running system management software locally to monitor and manage the IPMI of the host system 202. This figure illustrates a situation where a SEL record may be processed more than once. For instance, when the host system 202 is rebooted, the system management software application 204 has no way of knowing whether a particular record within the SEL 206 has been previously processed. Thus, it may process the same record(s) again.

Figure 3:
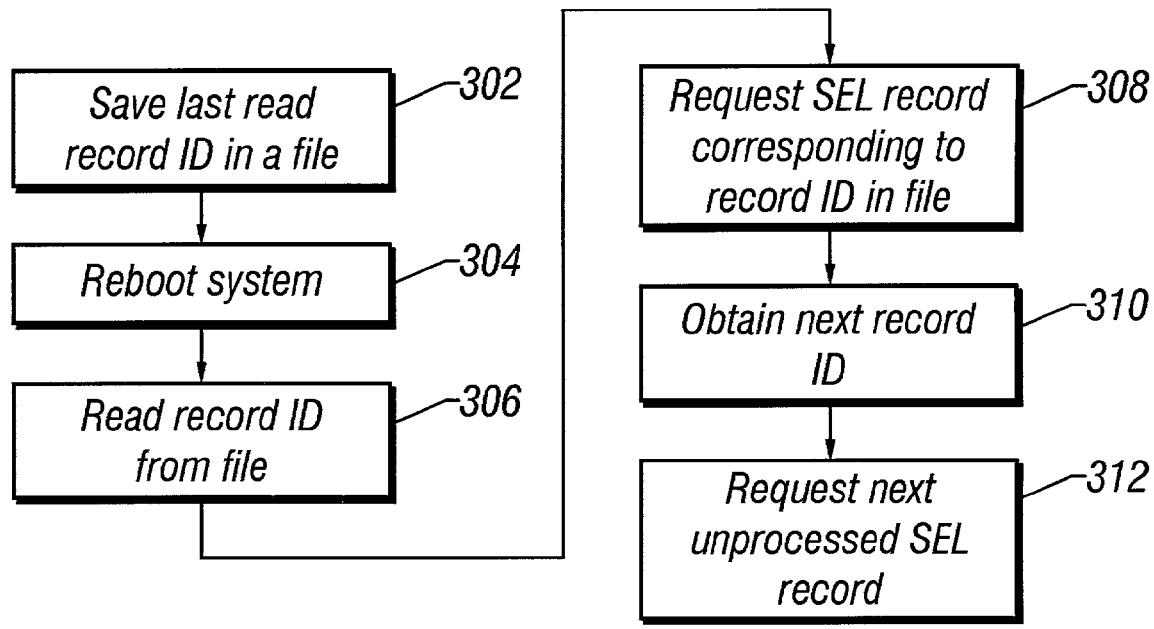
FIG. 3 is a flow diagram illustrating one aspect of the invention to prevent multiple processing of the same SEL record.

FIG. 3 is a flow diagram illustrating one embodiment of one aspect of the invention to prevent multiple processing of the same SEL record. To avoid the multiple processing of the same SEL record(s), while the host system is operating the system management software may save the last read SEL record ID in a file in the host system before the host system is rebooted 302. After the next host system reboot 304, during the initialization of the system management software, the record ID in the file is read to determine what is the last read record 306. The records may be arranged in a predetermined order in the SEL event log, for instance in ascending order based on the record ID. The system management software may then use the record ID to request the SEL record 308. The IPMI host system acknowledges the request by returning the requested SEL record along with the next record ID 310. The next record ID is then used to query and start processing the next unprocessed SEL record 312.

However, this mechanism may not solve the problem of multiple processing of SEL records where 1) a new operating system is installed in the host system and 2) multiple system management software applications operate on one or more remote systems to manage the same host system.

Where a new operating system has been installed in the host system, the new system management software running on the new operating system may not be able to access the file that contains the last read SEL record ID in an incompatible file system. Thus, the system management software running on the new operating system may not be able to determine which SEL records have been previously processed by the previous system management software.

Figure 4:
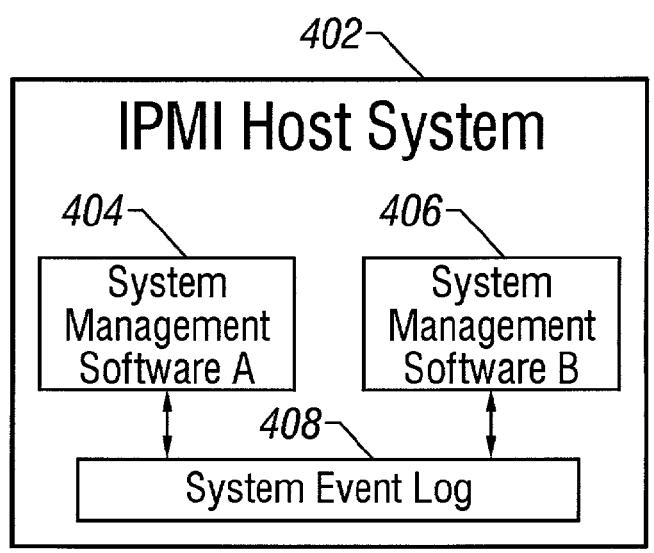
FIG. 4 shows one embodiment of a system configuration illustrating multiple system management software applications locally managing the same IPMI of a host system.

FIG. 4 illustrates a case where multiple system management software applications 404 and 406 on the host machine 402 may manage the same host system 402. Where multiple system management applications are present, none of the applications may know which SEL records or events have been previously processed or are currently being processed by other system management applications. For example, under the scheme described in FIG. 3, multiple system management applications, i.e. 404 and 406, may concurrently process the same event(s) from the system event log 408.

To solve the above problem, one aspect of the invention provides the use of the IPMI non-volatile "Last Software Processed Event ID" storage location to hold the last read SEL record ID. The IPMI Server Management Software (SMS) Message Channel serves as a mutual exclusive mechanism (mutex) for synchronization between multiple system management software reading the SEL.

Figure 5:
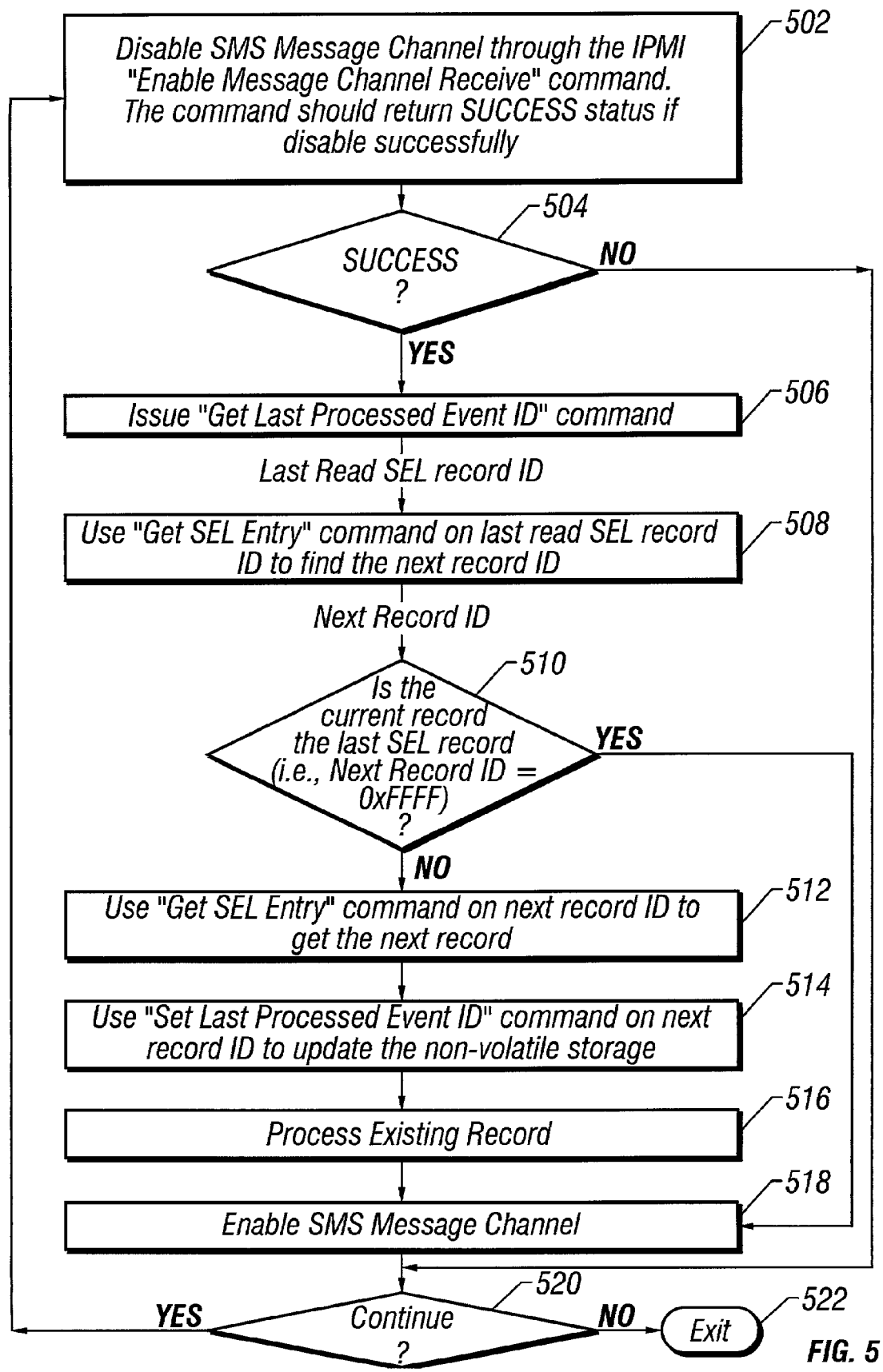
FIG. 5 is a flow diagram illustrating a method of one embodiment of the invention to avoid multiple processing of the same SEL record.

FIG. 5 illustrates one embodiment of this aspect of the invention to avoid multiple processing of the same SEL record. System management software that wants to avoid processing the same SEL record multiple times can request exclusive use of the SEL records by disabling the SMS Message Channel. Disabling the SMS Message Channel may be accomplished through the IPMI "Enable Message Channel Receive" command 502. The status of the SMS Message Channel determines whether a system management software application can lock and obtain the mutual exclusive use of the SEL.

The IPMI "Enable Message Channel Receive" command returns SUCCESS if the SMS Message Channel was disabled successfully and error if the channel was already disabled 504.

If the SMS Message Channel has already been disabled, the IPMI command returns error status other than SUCCESS 504. This means that another software has disabled the channel to indicate that it is using the SEL. The system management software can then decide to try to disable the SMS Message Channel again 520, exit 522, or wait before retrying to disable the channel again.

If SUCCESS is returned, then the system management software obtains exclusive use of the SEL. The system management software can then obtain the next available unprocessed SEL record and process it.

In one embodiment operating IPMI version 1.5, the command "Get Last Processed Event ID" may be invoked to obtain the last read SEL record ID (LAST_RECORD_ID) 506. From this LAST_RECORD_ID, the system management software can issue an IPMI "Get SEL Entry" command 508. This command returns the last processed record (LAST_RECORD) as well as the next, unprocessed, record ID (NEXT_RECORD_ID).

The system management software may then check the NEXT_RECORD_ID to determine if it is not the END-OF-SEL-RECORD indicator 510. For example, if the returned NEXT_RECORD_ID is "FFFF", this may indicate that no more records are available. If so, the system management software enables the SMS Message Channel and exits.

If the NEXT_RECORD_ID is not the END-OF-SEL-RECORD indicator, the management software then invokes the IPMI "Get SEL Entry" command to read the next unprocessed record (NEXT_RECORD) 512.

The software issues the "Set Last Processed Event ID" command with the NEXT_RECORD_ID as parameter to record the last processed record identification number 514. The management software then processes this NEXT_RECORD 516. After the NEXT_RECORD is processed, this completes the cycle of one SEL record reading and processing.

The management software then enables the SMS Message Channel to release its exclusive use of the SEL 518.

In one implementation, the management software then checks to see if more SEL records are available to be processed 520. If so, the management software attempts to again obtain exclusive use of the SEL, via the SMS Message Channel, and repeat the above process. If no other records are available for processing, the management software exits 522.

In FIG. 5, the exemplary mechanism of this aspect of the invention assumes two things. First, all system management software that does not want to reprocess the same SEL record multiple times follows this algorithm. Second, the SMS Message Channel is only used for the purpose described in this mechanism.

According to one embodiment, the method described and shown in FIG. 5, may only apply to in-band system management software. In-band software is that which accesses the host system locally. The method of the invention shown in FIG. 5 may apply only where in-band system management software is employed. This may be because one or more IPMI commands, such as "Enable Message Channel Receive", may not be accessed by out-of-band software or applications.

Out-of-band software on the other hand refers to system management software on a remote system/machine that does not rely on an operating system to connect to, communicate with, and access the IPMI running on a host system/machine. Out-of-band software does not rely on the operating system on the system/machine hosting the IPMI for connection, communication, and access to the host system/machine but rather may rely on firmware to obtain access to the SEL records.

The mechanism illustrated in FIG. 5 may not solve the problem of multiple processing of SEL records where 1) both in-band and out-of-band system management software are employed, and 2) only out-of-band system management software runs on one or more remote systems to manage an IPMI host system.

Figure 6:
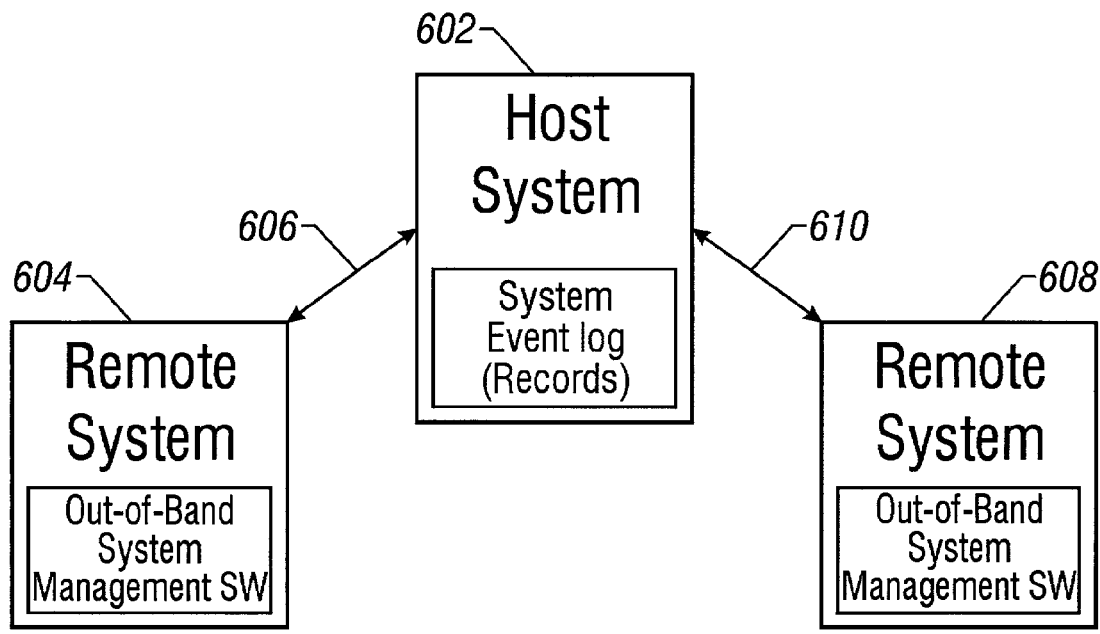
FIG. 6 shows one embodiment of a configuration illustrating a host system and multiple remote systems in which the invention may be employed.

FIG. 6 illustrates remote systems 604 and 608 running out-of-band system management software which may use dial-up connections 606 and 610 or some network cable connection to access a distributed management platform server (host system) 602 running IPMI.

Figure 7:
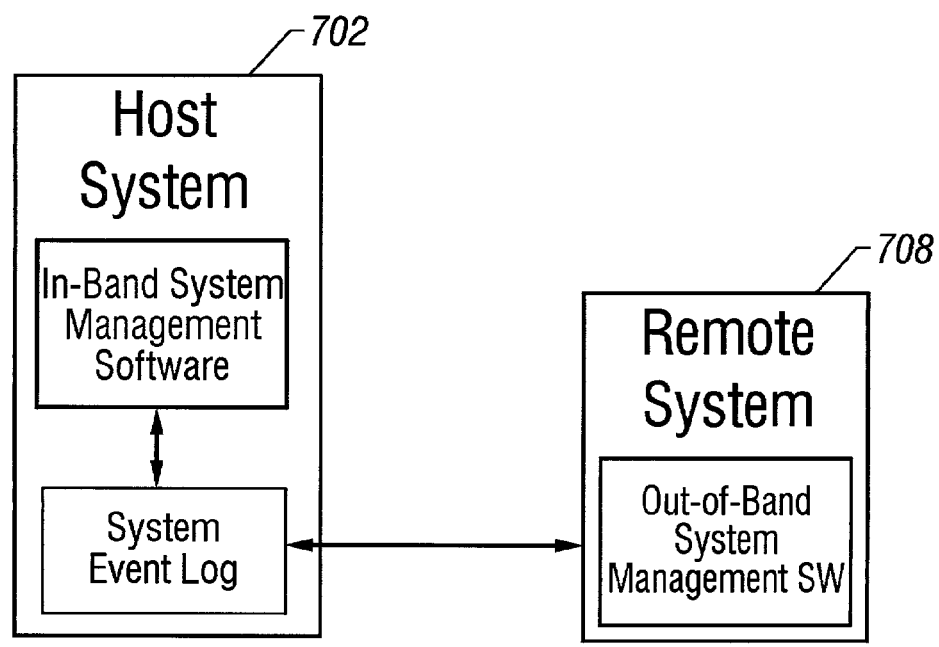
FIG. 7 shows one embodiment of a second configuration illustrating a host system and a remote system in which the invention may be employed.

FIG. 7 illustrates an IPMI host system 702 which may be accessed by both an in-band and out-of-band system management applications running on a remote 708.

In both of the cases illustrated in FIGS. 6 and 7, SEL records/events may be processed more than once since each system management application does not know whether another system management application has previously processed the same SEL record/event. That is, under certain conditions, the out-of-band system management software may not be able to implement the method illustrated in FIG. 5. For instance, the out-of-band system management software running on remote system 604 and 608 may not be capable of remotely invoking the necessary IPMI commands necessary to carry out the method.

Figure 8:
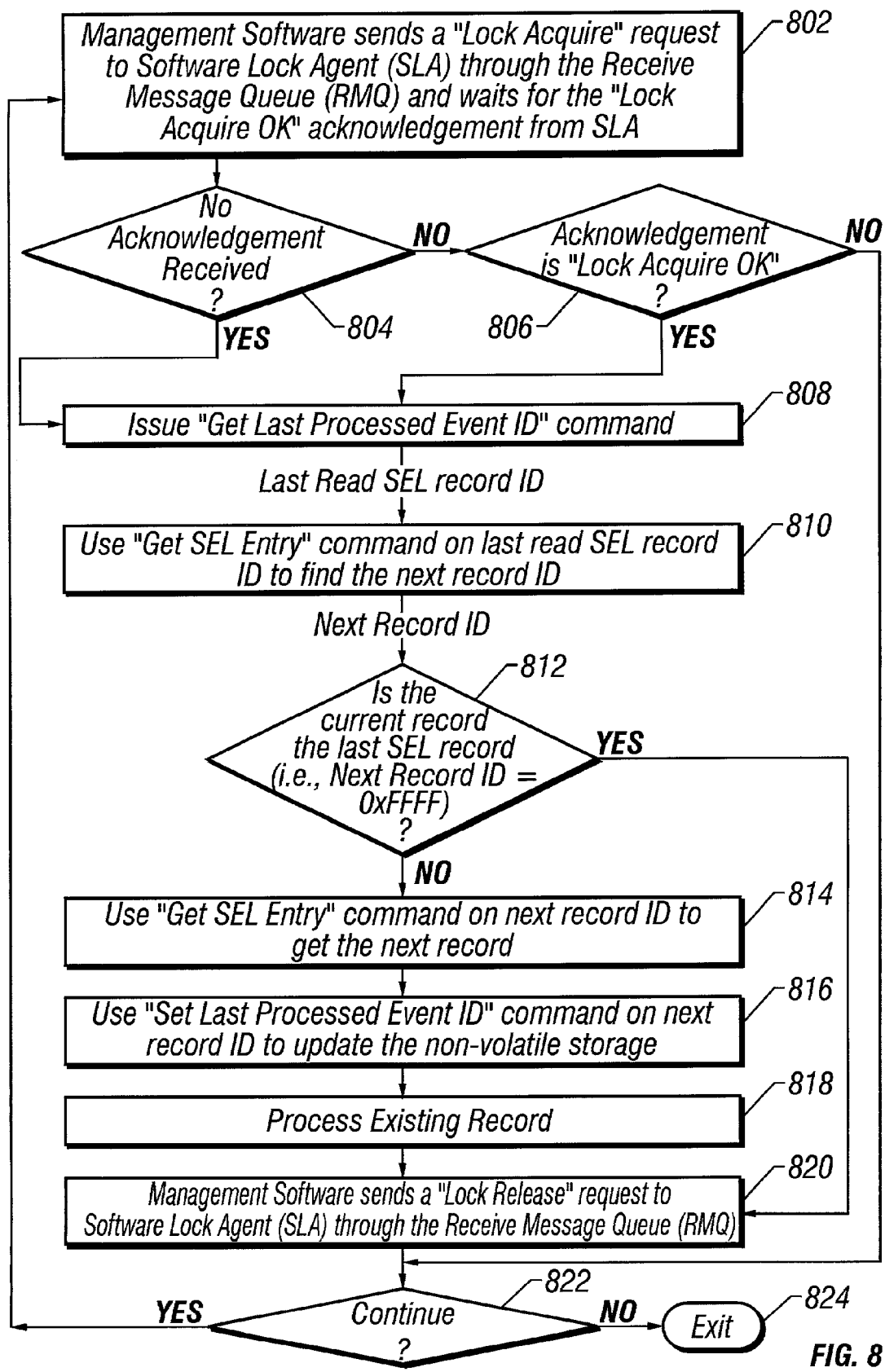
FIG. 8 is a flow diagram illustrating a method of practicing the invention which applies to any combination of both in-band and out-of-band system management software.

FIG. 8 illustrates another aspect of the invention which applies to any combination of both in-band and out-of-band system management software to avoid processing the same SEL record(s) more than once. This method provides yet another mechanism which provides mutual exclusive access to the SEL.

In one embodiment of the invention, a software process called Software Lock Agent (SLA) is implemented on the host/managed system (the system implementing IPMI). When any system management software or application wants exclusive access, or mutex lock, of the SEL "Last Software Process Event ID" storage location, it sends a "Lock Acquire" request into the Receive Message Queue (RMQ) for the SLA 802.

The SLA then responds to this request 804. If another management application has already requested the lock from the SLA, then the lock is unavailable to subsequent requesting applications and the SLA responds with a "Lock Denial" acknowledgement to the requester 806. The requesting system management application may then try to resend the "Lock Acquire" request to get the lock, retry after a wait period, or exit 824.

If the SLA acknowledges the lock request with a "Lock Acquire OK" acknowledgement, this indicates that no other application presently holds the lock and the sender/requester has mutex lock of the SEL.

The requesting system management application can then access to the "Last Software Process Event ID" storage location, by issuing an IPMI "Get Last Processed Event ID" command or otherwise, to obtain the last read SEL record ID (LAST_RECORD_ID 808). From this LAST_RECORD_ID, the management software can issue an IPMI "Get SEL Entry" command 810. This command returns the last processed record (LAST_RECORD) as well as the next, unprocessed, record ID (NEXT_RECORD_ID).

In one embodiment, the system management software may then check the NEXT_RECORD_ID to determine if it is not the END-OF-SEL-RECORD indicator 812. For example, if the returned NEXT_RECORD_ID is "FFFF", this may indicate that no more records are available. If so, the system management software may send a "Lock Release" request to the SLA and exit.

If the NEXT_RECORD_ID is not the END-OF-SEL-RECORD indicator, the management software then invokes the IPMI "Get SEL Entry" command, using the NEXT_RECORD_ID as a parameter, to read the next unprocessed record (NEXT_RECORD) 814.

The software then issues the "Set Last Processed Event ID" command with the NEXT_RECORD_ID as parameter 816. This completes the cycle of one SEL record reading, processing, and marking. The management software then processes this NEXT_RECORD 818.

When it finishes, the system management software then sends a "Lock Release" request to the SLA, via the RMQ or otherwise, to release its exclusive use of the SEL 820. The SLA then releases the lock of the SEL so that it can be granted to the next "Lock Acquire" requester.

In one implementation, the management software then checks to see if more SEL records are available to be processed 822. If so, the management software attempts to again obtain exclusive use of the SEL, via the SLA lock, and repeat the above process. If no other records are available for processing, the management software exits 824.

Since the SLA is a software application, an operating system is assumed to be present and running on the managed system. If the operating system is not running, no in-band system management software runs either. In that case, assuming a single out-of-band management software is running, if an out-of-band management software doesn't receive an acknowledgement from SLA after sending the "Lock Acquire" request 804 for a time-out period, say 30 seconds, it can assume that the operating system is not running and it can exclusively access to the "Last Software Process Event ID" storage location.

However, without an operating system running, the method illustrated in FIG. 8 cannot support the case where multiple out-of-band management software applications are trying to monitor and control the IPMI on a single host system. That is, without the operating system the SLA cannot run on the host system to synchronize write access to the "Last Software Process Event ID" storage location.

Figure 9:
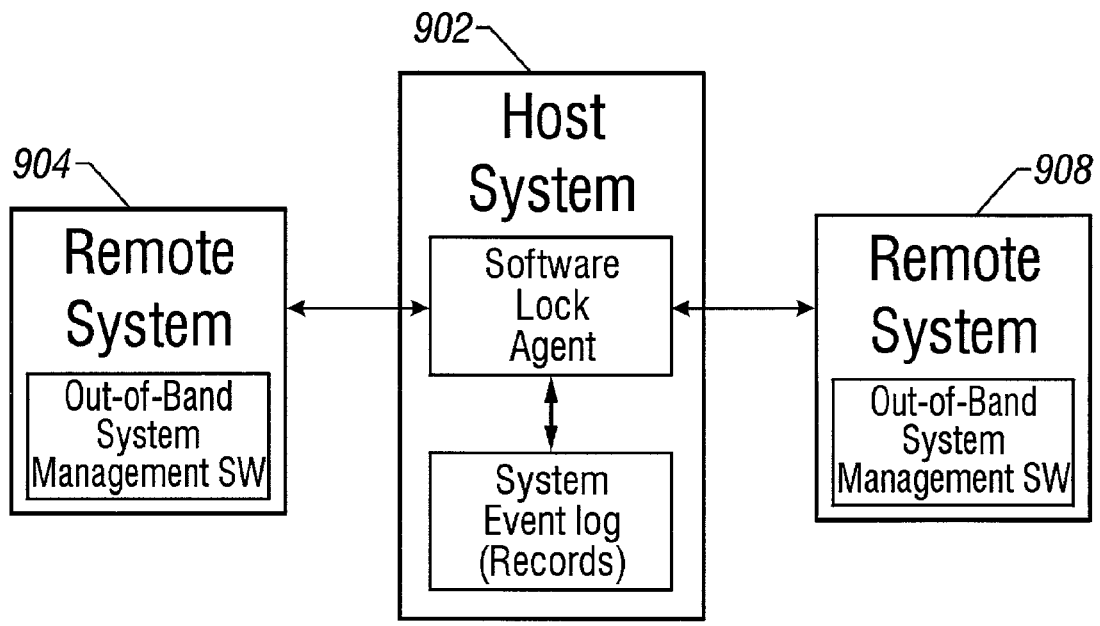
FIG. 9 shows one embodiment of a configuration illustrating an embodiment of the invention where a software lock agent synchronizes access to the system event log by one or more out-of-band system management software applications.

FIG. 9 illustrates how in one embodiment of the invention a software lock agent (SLA) synchronizes access to the system event log by one or more out-of-band system management software applications. The software lock agent may run on a host system 902 and communicate with one or more out-of-band system management software applications (i.e. in remote systems 904 and 908) to control and synchronize access to the system event log. The out-of-band system management software may request exclusive access to the system event log via the software lock agent. If exclusive access to the system event log is not presently assigned to another system management software, then the software lock agent grants exclusive access to the first system management software to make such request. Otherwise, the software lock agent rejects the request. A system management software which has obtained a lock or exclusive access to the SEL may release its lock or exclusive access by sending a message to the software lock agent when it is done processing.

Figure 10:
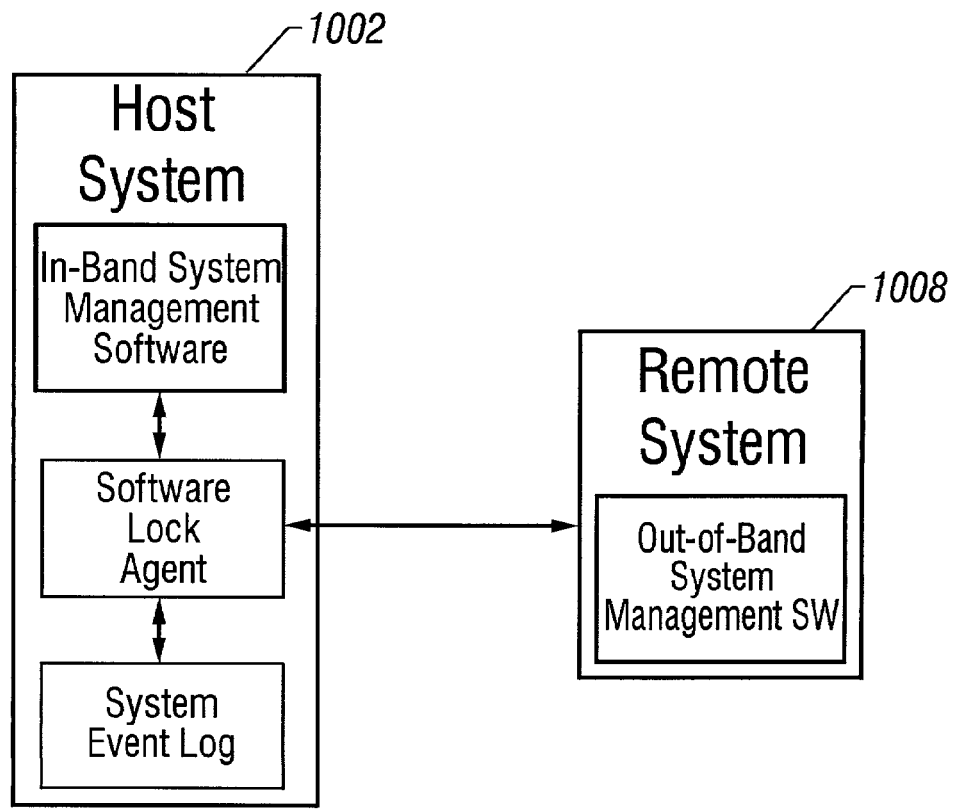
FIG. 10 shows one embodiment of a second configuration illustrating an embodiment of the invention where a software lock agent synchronizes access to the system event log by both in-band and out-of-band system management software.

FIG. 10 illustrates another embodiment of the invention where a software lock agent synchronizes access to the system event log by one or more in-band system management software applications (i.e. in host system 1002) and one or more out-of-band system management software (i.e. in remote system 1008). The software lock agent illustrated in FIG. 10 operates much like the software lock agent illustrated in FIG. 9 and described above to control and synchronize exclusive access to the system event log by both in-band and out-of-band system management software.

According to one embodiment, while the software lock agent may coordinate exclusive access to the SEL, it does not prevent access to the SEL per se. That is, system management software applications that ignore the access control mechanism of the software lock agent may access the SEL despite another system management software having received an exclusive use lock over the SEL from the software lock agent.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Additionally, it is possible to implement the invention or some of its features in hardware, programmable devices, firmware, software or a combination thereof where the software is provided in a processor readable storage medium such as a magnetic, optical, or semiconductor storage medium.

What is claimed is:

1. A method comprising:
   a first system management application, of a set of system management applications for managing a host system including a second system management application, determining if an unprocessed record is present in a system event log by sending a request to a software process through a message queue; the software process granting exclusive use of the system event log (SEL) stored in a non-volatile memory of the host system to the first system management application, while preventing the second system management application from accessing the SEL concurrently, wherein the first system management application and the second system management system application are running concurrently, and wherein the system event log is the system event log of an Intelligent Platform Management Interface (IPMI) operating in the host system;
   the first system management application obtaining a first identifier corresponding to an unprocessed record, the first identifier for the unprocessed record of the SEL being derived from a second identifier stored in an identifier (ID) file in the non-volatile memory of the host system indicating a previously processed record of the SEL, the ID file storing the second identifier being separated from the SEL;
   the first system management application retrieving the unprocessed record from the SEL corresponding to the obtained first identifier;
   the first system management application performing a predetermined operation on the host system in response to the retrieved unprocessed record from the SEL; and
   the first system management application storing the first identifier in the ID file after the predetermined operation has been performed, the stored first identifier indicating that the record associated with the first identifier has been processed, and determining the next unprocessed record.

2. The method of claim 1 wherein the previously processed record is processed by the second management application and the second identifier associated with the previously processed record is stored by the second management application after processing the previously processed record.

3. The method of claim 2 wherein the second system management application processes the previously processed record and stores the second identifier in the ID file prior to a reinitialization of the host system, and wherein the first system management application obtains the first identifier after the host system has been reinitialized, the first identifier indicating a next unprocessed record from the SEL.

4. The method of claim 3 wherein the ID file is maintained persistently and separately from the SEL during the reinitialzation of the host system including reboot of the host system.

5. The method of claim 1 wherein the one or more system management applications include one of out-of-band system management applications and in-band system management applications.

6. The method of claim 1 further comprising:
   processing the unprocessed record; and
   releasing exclusive use of the system event log.

7. The method of claim 1 further comprising:
   determining if there are additional records to process.

8. The method of claim 1 further comprising: storing the identifier corresponding to the unprocessed record in non-volatile memory.

9. The method of claim 1 further comprising:
   storing the identifier corresponding to the unprocessed record in the Intelligent Platform Management Interface Last Software Process Event ID storage location.

10. A method comprising:
    a first system management application, of a set of system management applications for managing a host system including a second system management application, determining if an unprocessed record is present in a system event log by sending a request to a software process through a message Queue;
    the software process granting exclusive use of the system event log (SEL stored in a non-volatile memory of the host system to the first system management application, while preventing the second system management application from accessing the SEL concurrently, wherein the first system management application and the second system management system application are running concurrently, wherein each of records of the SEL is processed only once by one of the set of system management applications and wherein the unprocessed record is a record of an Intelligent Platform Management Interface (IPMI) event;
    the first system management application obtaining a first identifier corresponding to an unprocessed record, the first identifier for the unprocessed record of the SEL being derived from a second identifier stored in an identifier (ID) file in the non-volatile memory of the host system indicating a previously processed record of the SEL, the ID file storing the second identifier being separated from the SEL;
    the first system management application retrieving the unprocessed record from the SEL corresponding to the obtained first identifier;
    the first system management application performing a predetermined operation on the host system in response to the retrieved unprocessed record from the SEL; and
    the first system management application storing the first identifier in the ID file after the predetermined operation has been performed, the stored first identifier indicating that the record associated with the first identifier has been processed, and determining the next unprocessed record.

11. The method of claim 10, wherein whether a specific record of SEL has been processed is determined based on whether an identifier associated with the specific record has been stored in the ID file.

12. The method of claim 11 wherein an identifier associated with the specific record is only stored in the ID file only if the specific record has been processed by a system management application that processed the specific record.

13. A machine-readable medium comprising at least one instruction to synchronize the exclusive use of the system event log, which when executed by a processor, causes the processor to perform operations comprising:
 a first system management application, of a set of system management applications for managing a host system including a second system management application, determining if an unprocessed record is present in a system event log by sending a request to a software process through a message queue; the software process granting exclusive use of the system event log (SEL) stored in a non-volatile memory of the host system to the first system management application, while preventing the second system management application from accessing the SEL concurrently, wherein the first system management application and the second system management system application are running concurrently, and wherein the system event log is the system event log of an Intelligent Platform Management Interface (IPMI) operating in the host system;
 the first system management application obtaining a first identifier corresponding to an unprocessed record, the first identifier for the unprocessed record of the SEL being derived from a second identifier stored in an identifier (ID) file in the non-volatile memory of the host system indicating a previously processed record of the SEL, the ID file storing the second identifier being separated from the SEL;
 the first system management application retrieving the unprocessed record from the SEL corresponding to the obtained first identifier;
 the first system management application performing a predetermined operation on the host system in response to the retrieved unprocessed record from the SEL; and
 the first system management application storing the first identifier in the ID file after the predetermined operation has been performed, the stored first identifier indicating that the record associated with the first identifier has been processed, and determining the next unprocessed record.

14. The machine-readable medium of claim 13 wherein the previously processed record is processed by the second management application and the second identifier associated with the previously processed record is stored by the second management application after processing the previously processed record.

15. A machine-readable medium comprising at least one instruction to synchronize the exclusive use of the system event log, which when executed by a processor, causes the processor to perform operations comprising:
 a first system management application, of a set of system management applications for managing a host system including a second system management application, determining if an unprocessed record is present in a system event log by sending a request to a software process through a message queue; the software process granting exclusive use of the system event log (SEL) stored in a non-volatile memory of the host system to the first system management application, while preventing the second system management application from accessing the SEL concurrently, wherein the first system management application and the second system management system application are running concurrently, wherein each of records of the SEL is processed only once by one of the set of system management applications and wherein the unprocessed record is a record of an Intelligent Platform Management Interface (IPMI) event;
 the first system management application obtaining a first identifier corresponding to an unprocessed record, the first identifier for the unprocessed record of the SEL being derived from a second identifier stored in an identifier (ID) file in the non-volatile memory of the host system indicating a previously processed record of the SEL, the ID file storing the second identifier being separated from the SEL;
 the first system management application retrieving the unprocessed record from the SEL corresponding to the obtained first identifier;
 the first system management application performing a predetermined operation on the host system in response to the retrieved unprocessed record from the SEL; and
 the first system management application storing the first identifier in the ID file after the predetermined operation has been performed, the stored first identifier indicating that the record associated with the first identifier has been processed, and determining the next unprocessed record.

16. The machine-readable medium of claim 15, wherein whether a specific record of SEL has been processed is determined based on whether an identifier associated with the specific record has been stored in the ID file.

17. The machine-readable medium of claim 16 wherein an identifier associated with the specific record is only stored in the ID file only if the specific record has been processed by a system management application that processed the specific record.

18. A system comprising:
 a processor;
 a machine-readable medium comprising a set of instructions, which when executed, perform operations comprising:
  a first system management application, of a set of system management applications for managing a host system including a second system management application, determining if an unprocessed record is present in a system event log by sending a request to a software process through a message queue; the software process granting exclusive use of the system event log (SEL) stored in a non-volatile memory of the host system to the first system management application, while preventing the second system management application from accessing the SEL concurrently, wherein the first system management application and the second system management system application are running concurrently, and wherein the system event log is the system event log of an Intelligent Platform Management Interface (IPMI) operating in the host system;

the first system management application obtaining a first identifier corresponding to an unprocessed record, the first identifier for the unprocessed record of the SEL being derived from a second identifier stored in an identifier (ID) file in the non-volatile memory of the host system indicating a previously processed record of the SEL, the ID file storing the second identifier being separated from the SEL;

the first system management application retrieving the unprocessed record from the SEL corresponding to the obtained first identifier;

the first system management application performing a predetermined operation on the host system in response to the retrieved unprocessed record from the SEL; and the first system management application storing the first identifier in the ID file after the predetermined operation has been performed, the stored first identifier indicating that the record associated with the first identifier has been processed, and determining the next unprocessed record.

* * * * *

UNITED STATES PATENT AND TRADEMARK OFFICE
CERTIFICATE OF CORRECTION

| | | |
|---|---|---|
| PATENT NO. | : 7,127,722 B2 | |
| APPLICATION NO. | : 09/884400 | |
| DATED | : October 24, 2006 | |
| INVENTOR(S) | : Cheng et al. | |

It is certified that error appears in the above-identified patent and that said Letters Patent is hereby corrected as shown below:

In column 8, at line 39, delete "(SEL" and insert --(SEL)--.
In column 10, at line 64, after "running" insert --substantially--.

Signed and Sealed this

Fourth Day of September, 2007

JON W. DUDAS
*Director of the United States Patent and Trademark Office*